E. Bredt,
Making Baskets.
Nº 48,255.   Patented June 20, 1865.

Witnesses;
Lemuel W. Serrell
Chas H. Smith

Inventor;
E. Bredt

UNITED STATES PATENT OFFICE.

ERNST BREDT, OF NEW YORK, N. Y.

IMPROVED MEANS FOR MANUFACTURING BASKETS.

Specification forming part of Letters Patent No. 48,255, dated June 20, 1865.

*To all whom it may concern:*

Be it known that I, ERNST BREDT, of the city and State of New York, have invented, made, and applied to use a certain new and useful Improvement in the Manufacture of Baskets; and I do hereby declare the following to be a full, clear, and exact description of the said invention, reference being had to the annexed drawings, making part of this specification, wherein—

Figure 2:
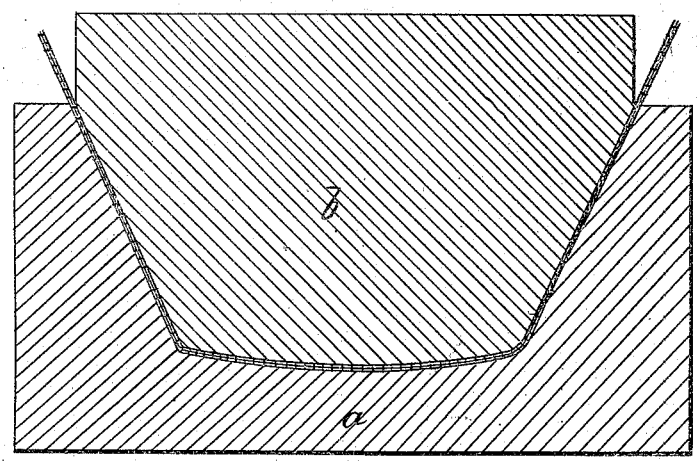
Figure 1:
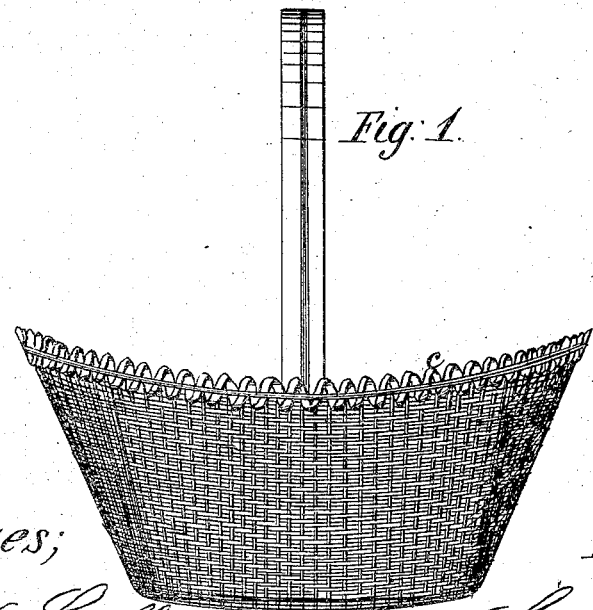

Figure 1 is a side view of a basket made in my improved manner, and Fig. 2 is a section of the basket and the dies employed in pressing the same.

Baskets have heretofore been made by strips or splints of willow and other materials interlaced together in the desired form, and in some instances a shape has been employed over which the said strips are bent as they are interlaced. These baskets have in all instances been shaped in the act of interlacing the strips of which they are composed.

The nature of my said invention consists in an improved basket manufactured, by pressure between heated dies, of a flat piece of material suitably prepared with sizing or stiffening, whereby the basket is shaped very quickly, and by the action of the heat on the sizing or stiffening that shape is rendered permanent. These baskets are much cheaper than those interlaced in the usual manner, and they are a new manufacture.

In the drawings, *a* represents a hollow die of the shape of the exterior of the basket, and *b* is a die corresponding with the interior of the basket. These dies are to be heated in any convenient manner, such as by heated bolts inserted into cavities in the dies; or said dies may be hollow and heated by steam, gas, or fire. I employ any suitable press that will separate the dies or bring them together with the required power.

The sheet of material out of which the basket is to be made is softened by moisture and prepared with sizing or stiffening, and it is introduced between the dies when open and pressed up into the shape required for a basket and dried by the action of the heated dies, care being taken to prevent the formation of wrinkles in the material. This can be done by holding or pulling the edge of the material outside the dies. The basket, as formed and shaped by the dies, is afterward to be finished by cutting off the surplus material and by the use of any suitable or ornamental edge around the basket, as at *c*, Fig. 1, and a handle or handles are to be attached, as required. The size and shape of these baskets may be varied, and they may be made of two parts, one forming the lid and the other the bottom; and I have employed the term "basket" as including any portable receptacle adapted to the holding of loose articles; and it will be seen that my baskets may be made out of woven or flat sheets of any fabric or material adapted to the purpose for which said baskets are employed.

What I claim, and desire to secure by Letters Patent, is—

A basket formed, by pressure between heated dies, of a sheet of material suitably prepared with sizing, stiffening, or moisture, substantially as specified.

In witness whereof I have hereunto set my signature this 17th day of April, 1865.

ERNST BREDT.

Witnesses:
LEMUEL W. SERRELL,
THOS. GEO. HAROLD.